US011196876B2

(12) United States Patent
Chen et al.

(10) Patent No.: US 11,196,876 B2
(45) Date of Patent: Dec. 7, 2021

(54) 3-D PROJECTION PRINTING SYSTEM AND FABRICATION METHOD THEREFOR

(71) Applicant: Young Optics Inc., Hsinchu (TW)

(72) Inventors: Chao-Shun Chen, Hsinchu (TW); Chang-Chun Chen, Hsinchu (TW); Ming-Fu Hsu, Hsinchu (TW)

(73) Assignee: YOUNG OPTICS INC., Hsinchu (TW)

(*) Notice: Subject to any disclaimer, the term of this patent is extended or adjusted under 35 U.S.C. 154(b) by 0 days.

(21) Appl. No.: 16/549,424

(22) Filed: Aug. 23, 2019

(65) Prior Publication Data

US 2019/0387110 A1    Dec. 19, 2019

Related U.S. Application Data

(63) Continuation of application No. 15/224,507, filed on Jul. 29, 2016, now abandoned.

(51) Int. Cl.
| | |
|---|---|
| *B29C 64/00* | (2017.01) |
| *H04N 1/00* | (2006.01) |
| *B33Y 30/00* | (2015.01) |
| *B33Y 50/02* | (2015.01) |
| *G06K 15/02* | (2006.01) |
| *B29C 64/393* | (2017.01) |
| *B29C 64/291* | (2017.01) |

(52) U.S. Cl.
CPC ........ *H04N 1/00267* (2013.01); *B29C 64/291* (2017.08); *B29C 64/393* (2017.08); *B33Y 30/00* (2014.12); *B33Y 50/02* (2014.12); *G06K 15/027* (2013.01); *H04N 1/00251* (2013.01)

(58) Field of Classification Search
CPC .... H04N 1/00267; B33Y 30/00; B33Y 50/02; G06K 15/027
See application file for complete search history.

(56) References Cited

U.S. PATENT DOCUMENTS

| | | | |
|---|---|---|---|
| 5,398,121 A * | 3/1995 | Kowalewski | ........ H04N 1/6019 358/504 |
| 5,801,812 A | 9/1998 | Lo et al. | |
| 6,137,596 A * | 10/2000 | Decker | .................... G06K 9/00 358/1.9 |
| 2010/0315601 A1 | 12/2010 | Furui | |
| 2013/0141593 A1 | 6/2013 | Bassi et al. | |
| 2013/0321674 A1 | 12/2013 | Cote et al. | |
| 2014/0198204 A1* | 7/2014 | Papas | ................. G01N 21/4738 348/135 |
| 2014/0324204 A1* | 10/2014 | Vidimce | ............... B29C 64/386 700/98 |
| 2016/0339643 A1* | 11/2016 | Dikovsky | ............ B41M 5/0082 |
| 2017/0220031 A1* | 8/2017 | Morovic, Jr. | ......... B29C 64/393 |
| 2019/0152156 A1* | 5/2019 | Morovic | ............... B29C 64/386 |

* cited by examiner

*Primary Examiner* — Yung-Sheng M Tsui
(74) *Attorney, Agent, or Firm* — Muncy, Geissler, Olds and Lowe, P.C.

(57) ABSTRACT

The embodiment of the present invention provides a method for a 3-D projection printing system and a system thereof, more particularly to a system adopts both ways of look-up table and interpolation method to calibrate. The embodiment of the present invention provides a portable calibration fixture system and a flexible 3-D projection printing system in order to improve calibration precision, facilitate calibration and printing operations, increase printing effect and save cost.

9 Claims, 12 Drawing Sheets

3-D PROJECTION PRINTING SYSTEM AND FABRICATION METHOD THEREFOR

CROSS REFERENCE TO RELATED APPLICATIONS

This application is a Continuation of co-pending application Ser. No. 15/224,507, filed on Jul. 29, 2016, for which priority is claimed under 35 U.S.C. § 120, the entire contents of which are hereby incorporated by reference.

BACKGROUND OF THE INVENTION

1. Field of the Invention

The present invention generally relates to a fabrication method for a 3-D projection printing system and a system thereof, more particularly to a system adopts both the ways of look-up table and interpolation method to calibrate.

2. Description of the Prior Art

In case the lens of the projector is malfunctioned or deformed by some reasons as hot environment, falling down, etc., and/or the whole system happens tolerances while in assembly, the precisions for the system may not exist. Such system is applied to the field of 3-D printing very often, and the printing quality cannot be assured if aforesaid conditions do occur. Hence, an advanced 3-D projection system with an advanced fabrication method are deemed to be a developed issue to the people skilled in the art.

SUMMARY OF THE INVENTION

One embodiment of a fabrication method for a 3-D projection printing system comprises the steps of: the 3-D projection printing system capturing a light-uniform device with a projected single second sample pattern thereon to obtain a second practical pattern, the second practical pattern being calibrated by a second camera look-up table to gain a calibrated pattern, a comparison of the calibrated pattern and the second sample pattern being a first projection look-up table which is transformed to a second projection look-up table with a projection resolution as a resulted projection look-up table, and the resulted projection look-up table being stored in the 3-D projection printing system; and the 3-D projection printing system using the resulted projection look-up table to calibrate a plurality of sliced printing files, and then the plurality of calibrated sliced printing files being used to engaged in a projection printing work.

An embodiment of the present invention provides a method for a 3-D projection printing system and a system thereof, more particularly to a system adopts both ways of look-up table and interpolation method to calibrate. The embodiment of the present invention provide a portable calibration fixture system and a flexible 3-D projection printing system in order to improve calibration precision, facilitate calibration and printing operations, increase printing effect and save cost.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIGS. 3-1, 3-2, 3-3, 3-4 and 3-5 illustrate a plurality of schematic views of calibration projection steps of the embodiment of the present invention;

FIG. 4 illustrates a schematic system block of the first preferred embodiment of the present invention;

DETAILED DESCRIPTION OF THE INVENTION

Following preferred embodiments and figures will be described in detail so as to achieve aforesaid objects.

Figure 7:
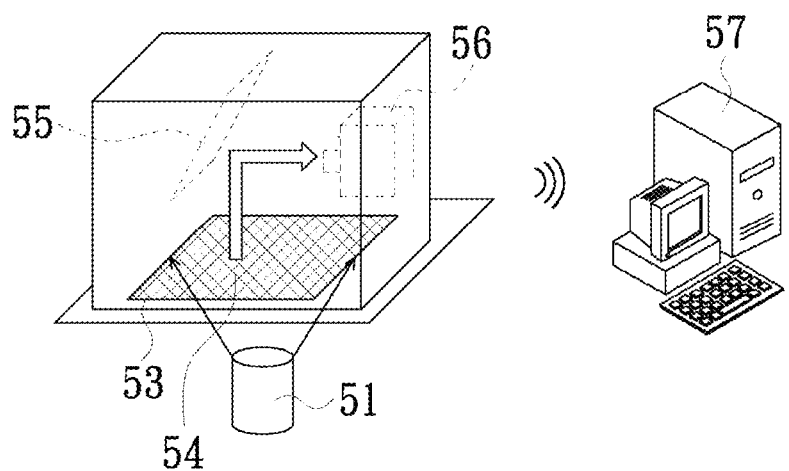
FIG. 7 illustrates a schematic view of a calibration projection system.

According to FIG. 7, which illustrates a schematic view of a calibration projection system. The system includes a projector 51, a diffuser 53, a reflection mirror 55, a camera 56, and a computer 57. The projector 51 projects a projected image 54 onto the diffuser 53. The projected image 54 goes through the diffuser 53, and then to the reflection mirror 55. The reflection mirror 55 reflects the projected image 54 to the camera 56. The camera 56 captures the reflected projected image 54. Continuously, the captured image in the camera 56 is digitized and sent to the computer 57 via WIFI, USB, Bluetooth, cable, or the other wireless/wired methods.

Figure 1A:
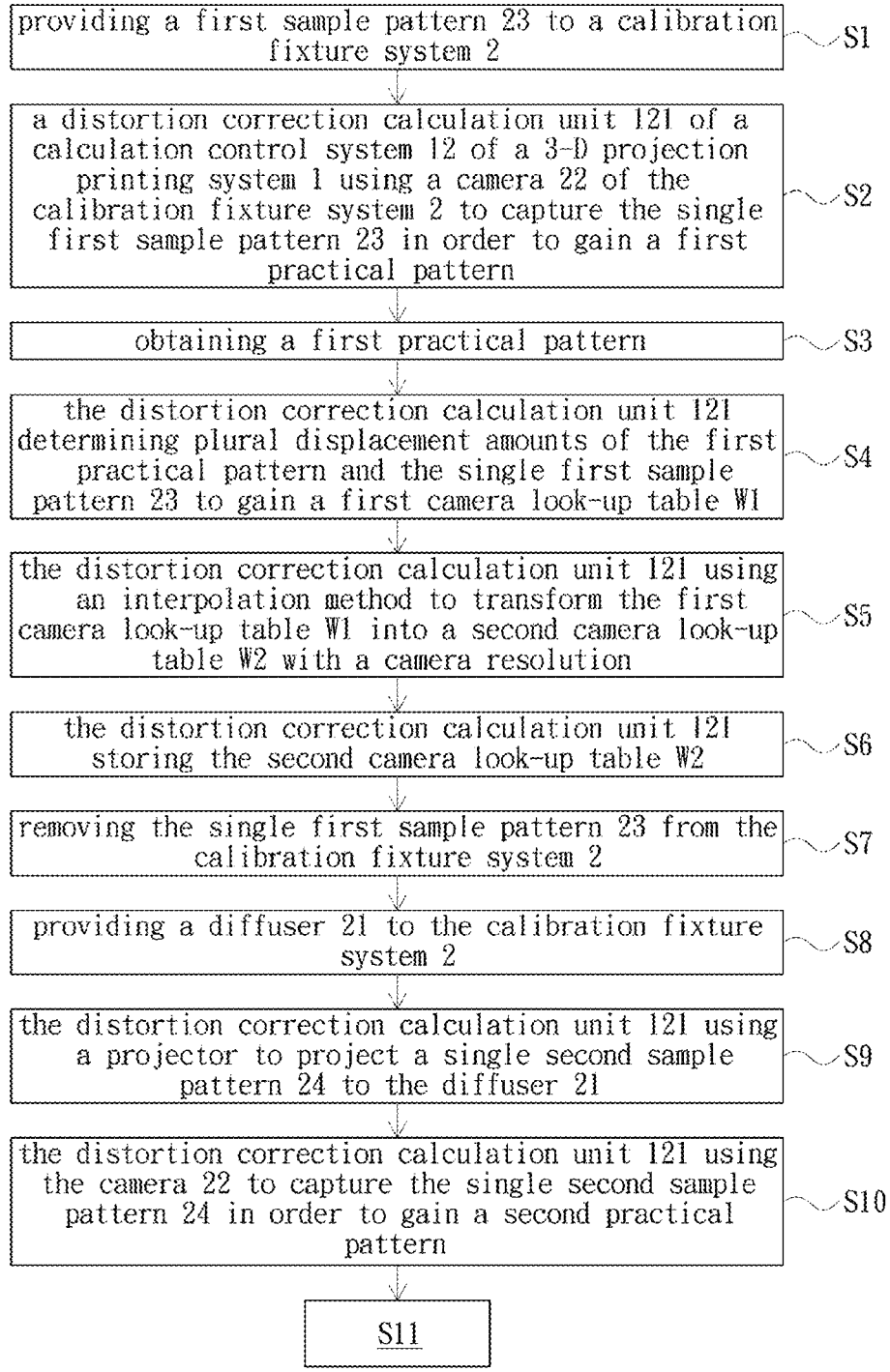
FIGS. 1A and 1B illustrate a flow chart of a first preferred embodiment of the present invention.
Figure 1B:
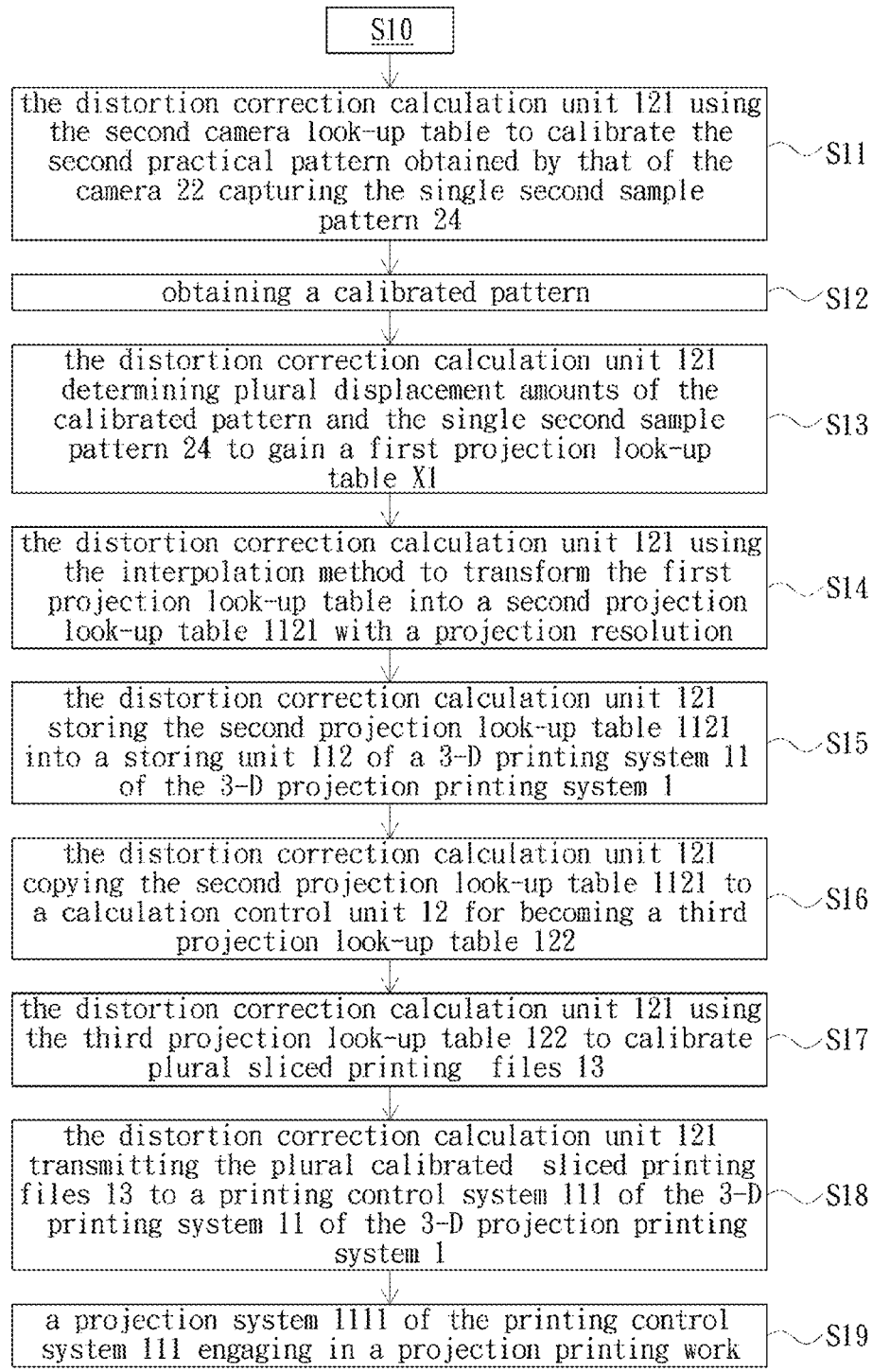
Figures 1, 2:
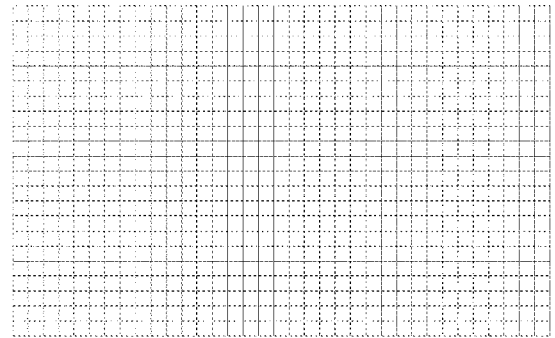
FIGS. 2-1, 2-2, 2-3 and 2-4 illustrate a plurality of schematic views of calibration fixture steps of the embodiment of the present invention.
Figure 2:
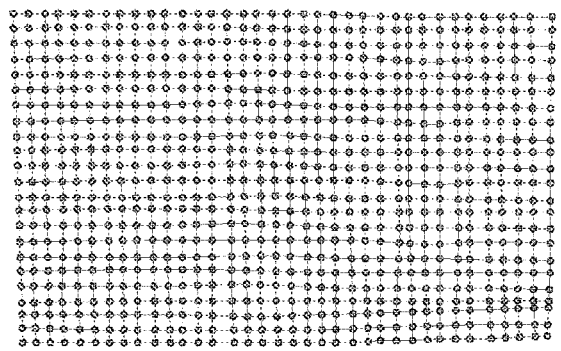
Figures 2, 3:
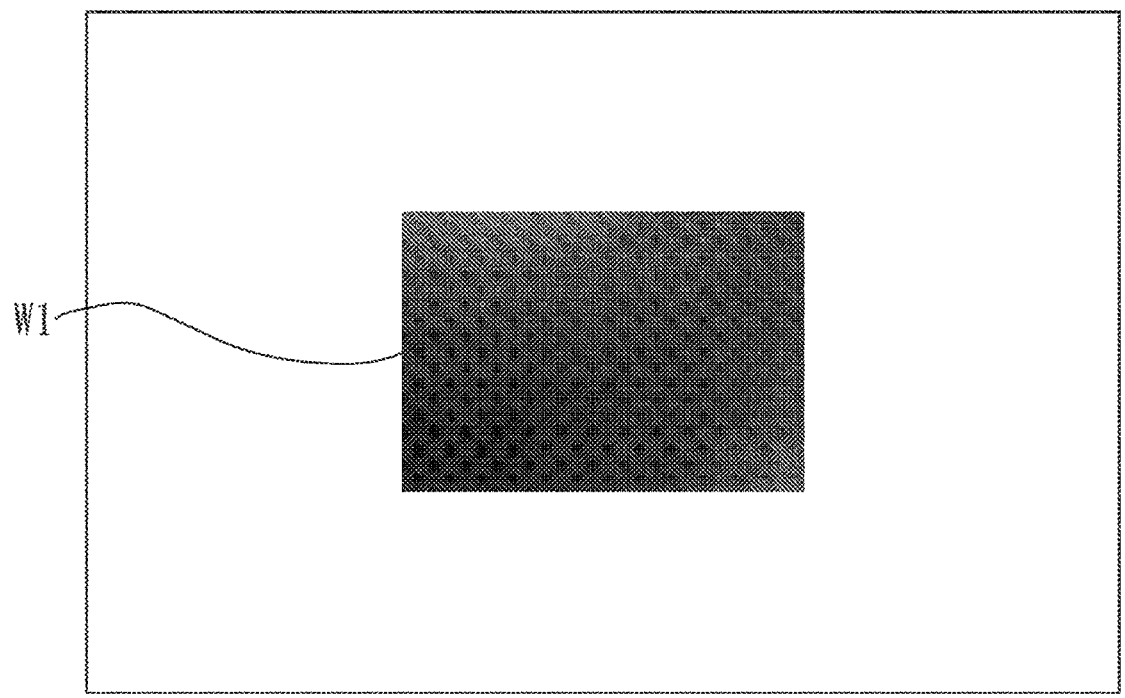
Figures 2, 3, 4:
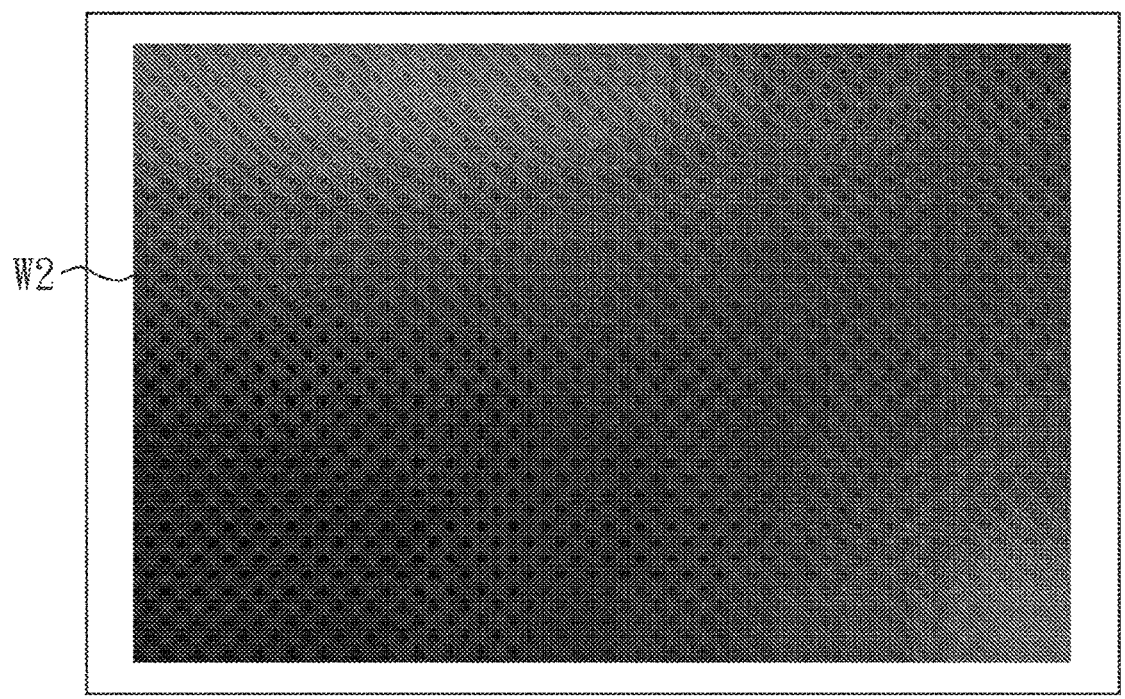
Figures 1, 3:
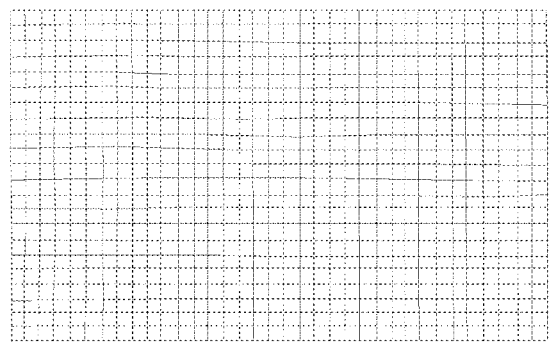
Figures 2, 3:
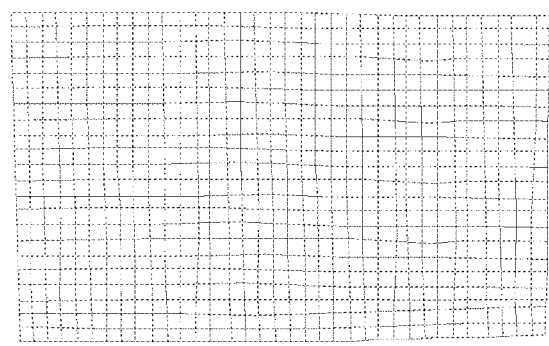
Figure 3:
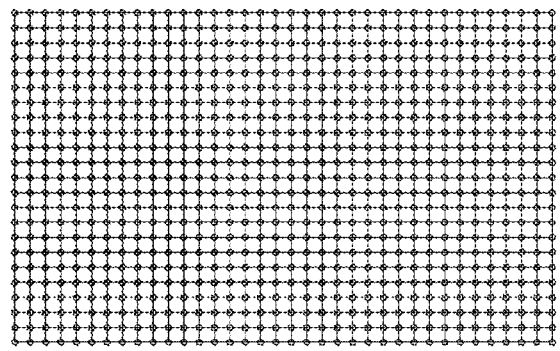
Figures 3, 4:
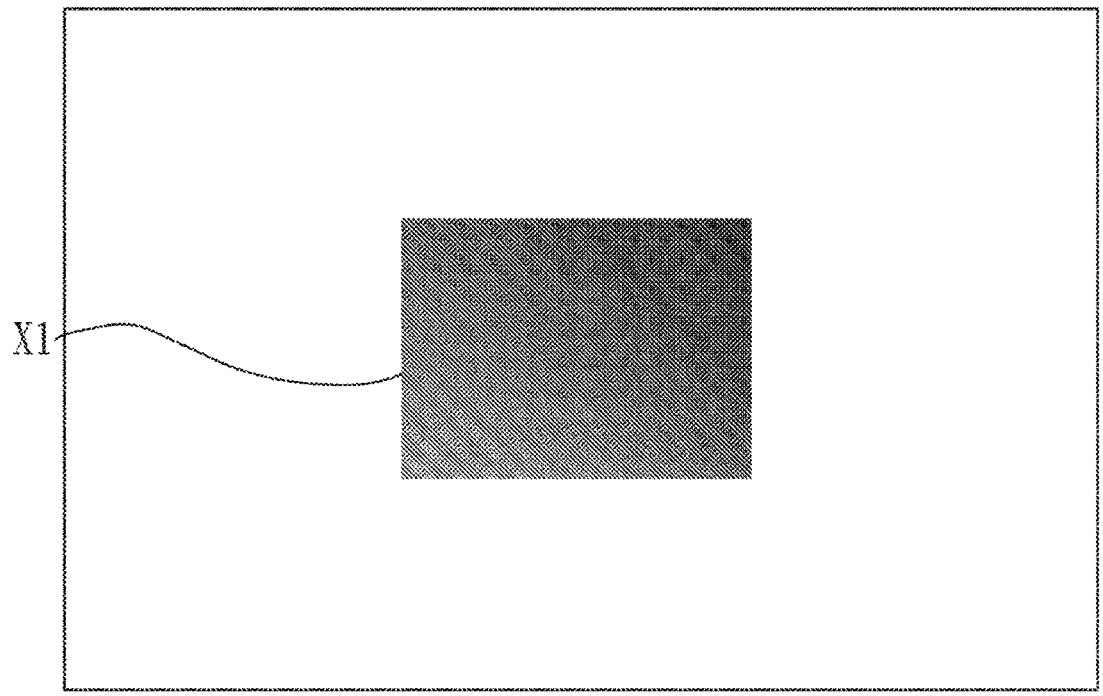
Figures 3, 4, 5:
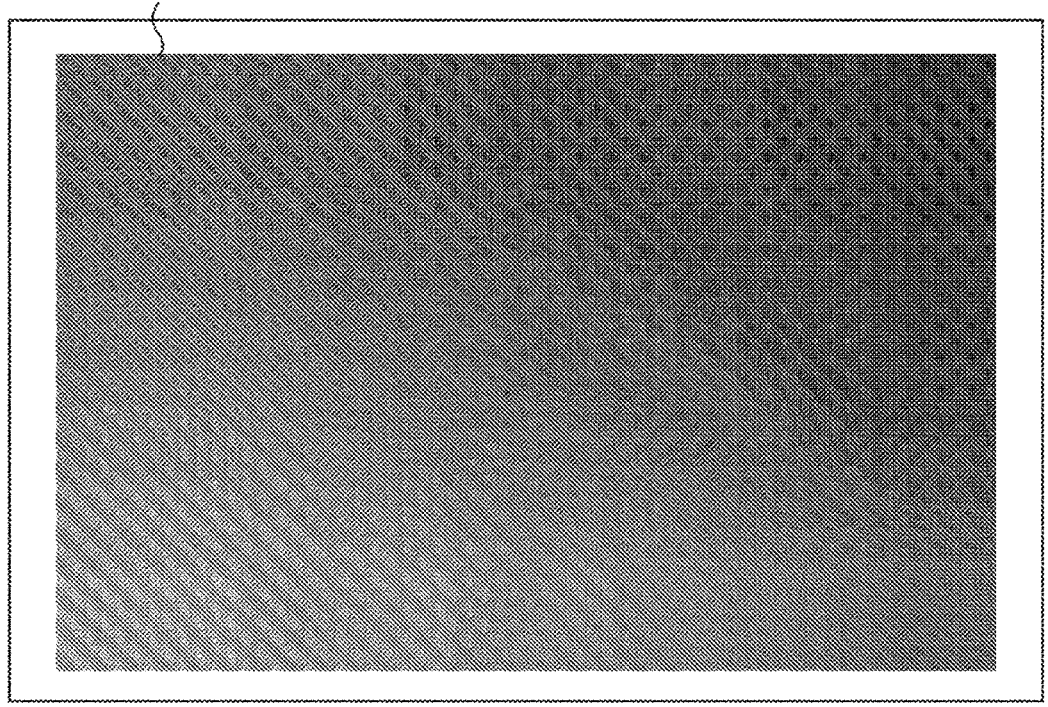
Figure 4:
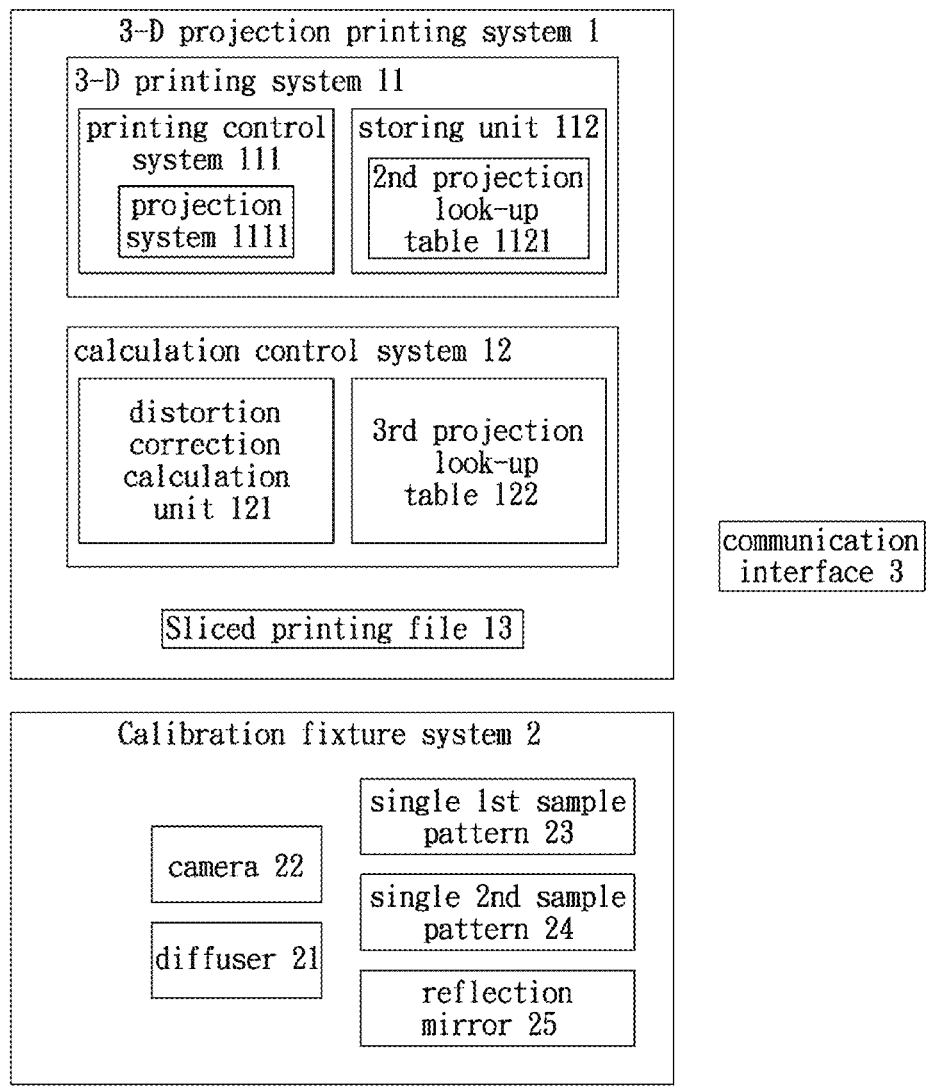

Please refer to FIGS. 1A-1B, FIGS. 2-1 to 2-4, FIGS. 3-1 to 3-5, and FIG. 4, which illustrate a flow chart, plural schematic views of calibration fixture steps, plural schematic views of calibration projection steps, and a schematic system block of the first preferred embodiment of the present invention. As shown in FIGS. 1A and 1B, the method includes the steps of:

(S1) providing a single first sample pattern 23 to a calibration fixture system 2;

(S2) a distortion correction calculation unit 121 of a calculation control system 12, which can be a computer for the preferred embodiment, of a 3-D projection printing system 1 using a camera 22 of the calibration fixture system 2 to capture the single first sample pattern 23, as shown in FIG. 2-1, which is a grid pattern;

(S3) obtaining a first schematic pattern, as shown in FIG. 2-2, which is another grid pattern with a plurality of nodes;

(S4) the distortion correction calculation unit 121 determining a plurality of displacement amounts of the nodes between the first schematic pattern and the single first sample pattern 23 to gain a first camera look-up table W1, as shown in FIG. 2-3;

(S5) the distortion correction calculation unit 121 using an interpolation method to transform the first camera look-up table W1 into a second camera look-up table W2 with a camera resolution, as shown in FIG. 2-4, wherein the view in FIG. 2-4 is larger than the view in FIG. 2-3, since the view in FIG. 2-4 is with a higher resolution;

(S6) the distortion correction calculation unit 121 storing the second camera look-up table W2;

(S7) removing the single first sample pattern 23 from the calibration fixture system 2;

(S8) providing a light-uniform device, which is a diffuser 21 for the preferred embodiment, to the calibration fixture system 2;

(S9) the distortion correction calculation unit 121 using the projection system 1111 of the printing control system 111 to project a single second sample pattern 24 to the diffuser 21, as shown in FIG. 3-1, which is a grid pattern;

(S10) the distortion correction calculation unit 121 using the camera 22 to capture the single second sample pattern 24 in order to gain a second schematic pattern;

(S11) the distortion correction calculation unit 121 using the second camera look-up table to calibrate the second schematic pattern obtained by that of the camera 22 capturing the single second sample pattern 24, as shown in FIG. 3-2, which is a grid pattern;

(S12) obtaining a calibrated pattern, as shown in FIG. 3-3, which is another grid pattern with a plurality of nodes;

(S13) the distortion correction calculation unit 121 determining a plurality of displacement amounts of the nodes between the calibrated pattern and the single second sample pattern 24 to gain a first projection look-up table X1, as shown in FIG. 3-4;

(S14) the distortion correction calculation unit 121 using the interpolation method to transform the first projection look-up table X1 into a second projection look-up table 1121 with a projection resolution, as shown in FIG. 3-5, wherein the view in FIG. 3-5 is larger than the view in FIG. 3-4, since the view in FIG. 3-5 is with a higher resolution;

(S15) the distortion correction calculation unit 121 storing the second projection look-up table 1121 into a storing unit 112 of a 3-D printing system 11 of the 3-D projection printing system 1;

(S16) the distortion correction calculation unit 121 copying the second projection look-up table 1121 to a calculation control system 12 for becoming a third projection look-up table 122 as a resulted projection look-up table;

(S17) the distortion correction calculation unit 121 using the third projection look-up table 122 to calibrate a plurality of sliced printing files 13;

(S18) the distortion correction calculation unit 121 transmitting the plurality of calibrated sliced printing files 13 to a printing control system 111 of the 3-D printing system 11 of the 3-D projection printing system 1; and (S19) a projection system 1111 of the printing control system 111 engaging in a projection printing work.

Again, please refer to FIG. 4, the calibration fixture system 2 includes the single first sample pattern 23, the projected single second sample pattern 24, the light-uniform device as the diffuser 21, wherein the camera 22 is used to capture the single first sample pattern 23 and the diffuser 21 with the projected single second sample pattern 24 thereon, and the reflection mirror 25 is used to reflect images of the camera 22 capturing the single first sample pattern 23 and the diffuser 21 with the projected single second sample pattern 24 thereon; and the 3-D projection printing system 1 has the 3-D printing system 11 and the calculation control system 12, wherein the 3-D printing system 11 has the printing control system 111 with the projection system 1111 and the storing unit 112 with the second projection look-up table 1121, and a computer (no shown in the FIG. 4) engages that of using the camera 22 to capture the single first sample pattern 23 in order to obtain the first practical pattern, determining the plurality of displacement amounts between the first practical pattern and the single first sample pattern 23 to gain the first camera look-up table, using the interpolation method to transform the first camera look-up table into the second camera look-up table with the camera resolution, storing the second camera look-up table, using the projection system 1111 of the printing control system 111 to project the single second sample pattern 24 to the diffuser 21, using the camera 22 to capture the single second sample pattern 24, using the second camera look-up table to calibrate the second practical pattern obtained by that of the camera 22 capturing the single second sample pattern 24 so as to obtain the calibrated pattern, determining the plurality of displacement amounts between the calibrated pattern and the single second sample pattern 24 to gain the first projection look-up table, using the interpolation method to transform the first projection look-up table into the second projection look-up table 112 with the projection resolution, storing the second projection look-up table 1121 into the storing unit 112 of the 3-D printing system 11 of the 3-D projection printing system 11, copying the second projection look-up table 1121 to the calculation control system 12 for becoming the third projection look-up table 122 as the resulted projection look-up table, using the resulted projection look-up table to calibrate the plurality of sliced printing files 13, and transmitting the plurality of calibrated sliced printing files 13 to the printing control system 111, and the projection system 1111 engaging in a projection printing work.

Figure 5A:
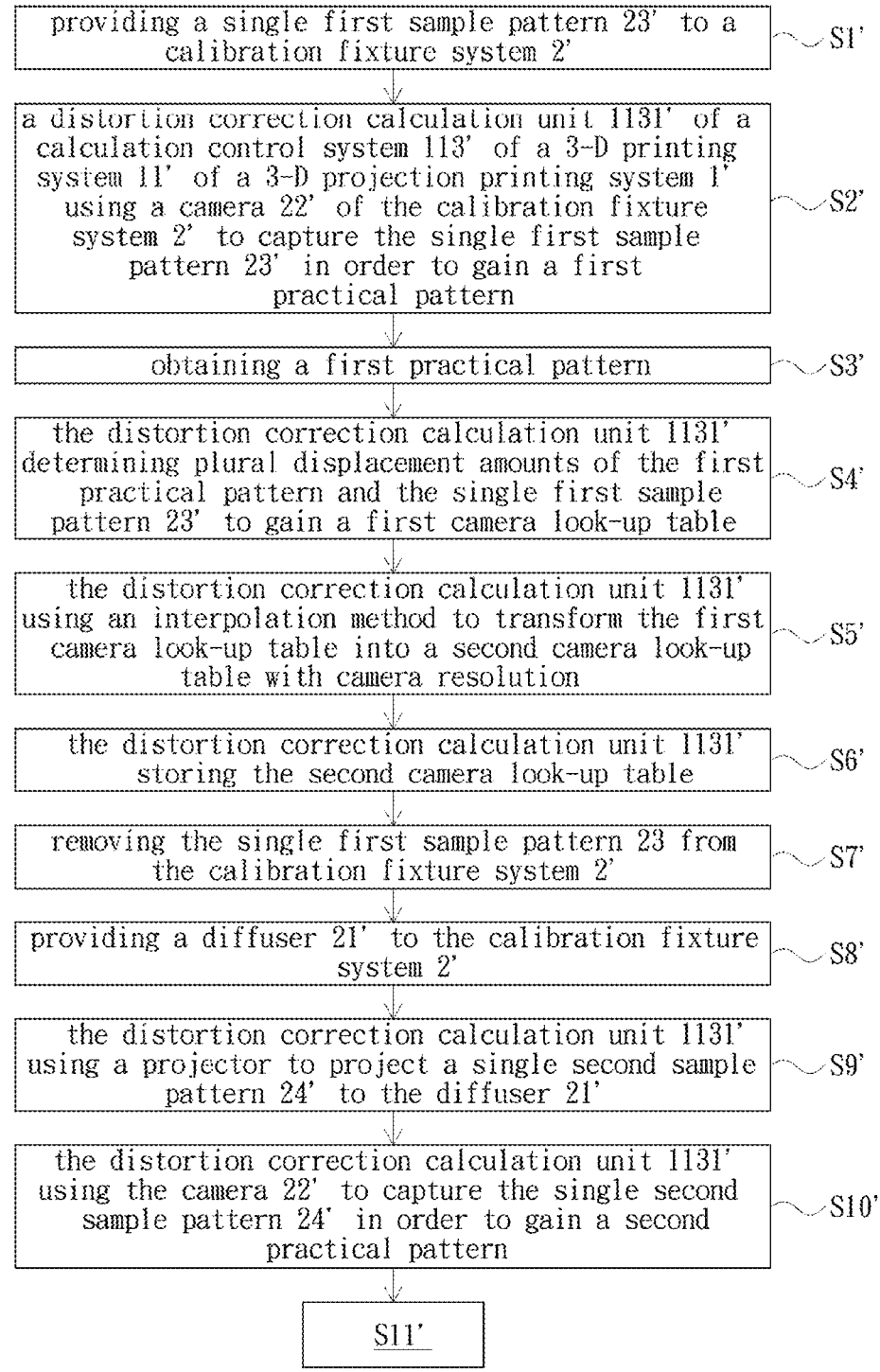
FIGS. 5A and 5B illustrate a flow chart of a second preferred embodiment of the present invention.
Figure 5B:
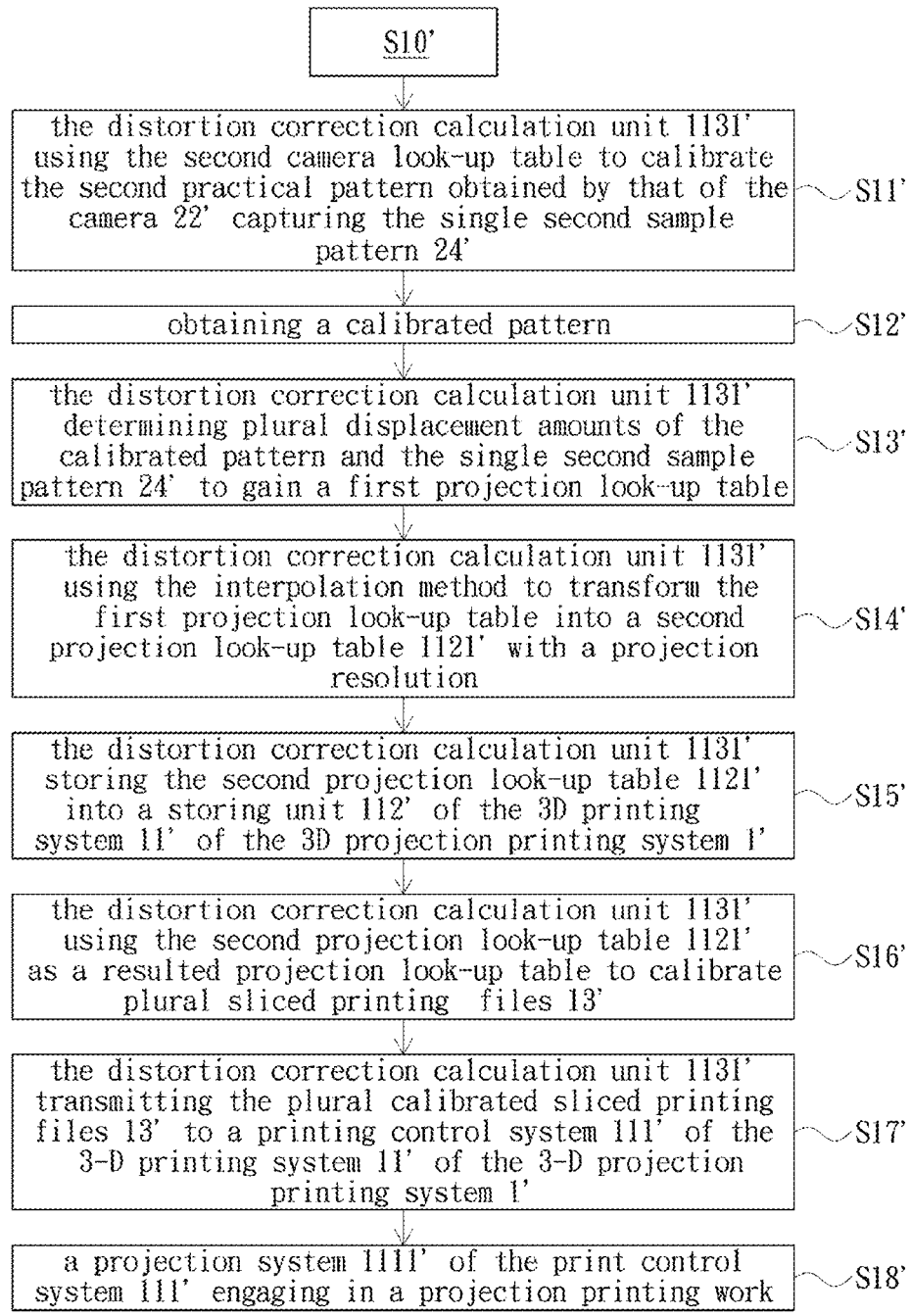

Please refer to FIGS. 5A and 5B, FIGS. 2-1 to 2-4, FIGS. 3-1 to 3-5, and FIG. 6, which illustrate a flow chart of a second preferred embodiment, plural schematic views of calibration fixture steps, plural schematic views of calibration projection steps, and a schematic system block of the second preferred embodiment of the present invention. As shown in FIGS. 5A and 5B, the method includes the steps of:

(S1')-(S15') is similar substantially as (S1)-(S15), so it is not described repeatedly here.

(S16') the distortion correction calculation unit 1131' using the second projection look-up table 1121' as a resulted projection look-up table to calibrate a plurality of sliced printing files 13';

(S17') the distortion correction calculation unit 1131' transmitting the plurality of calibrated sliced printing files 13' to a printing control system 111' of the 3-D printing system 11' of the 3-D projection printing system 1'; and (S18') a projection system 1111' of the print control system 111 engaging in a projection printing work.

Again, please refer to FIG. 6, the calibration fixture system 2' is similar substantially as the calibration fixture system 2, so it is not described repeatedly here.

The 3-D projection printing system 1' includes the 3-D printing system 11' which has the printing control system 111' with the projection system 1111', the storing unit 112' and the calculation control system 113' with the distortion correction calculation unit 1131', wherein the a computer (not shown in the FIG. 6) engages that of using the camera 22' to capture the single first sample pattern 23' in order to obtain the first practical pattern, determining a plurality of displacement amounts between the first practical pattern and the first sample pattern 23' to gain the first camera look-up table, using an interpolation method to transform the first camera look-up table into the second camera look-up table with the camera resolution, storing the second camera look-up table, using the projection system 1111' of the printing control system 111' to project the single second sample pattern 24' to the light-uniform device 21', using the camera 22' to capture the second sample pattern 24', using the second camera look-up table to calibrate the second practical pattern obtained by that of the camera 22' capturing the second sample pattern 24' so as to obtain the calibrated pattern, determining a plurality of displacement amounts between the calibrated pattern and the second sample pattern 24' to gain the first projection look-up table, using the interpolation method to transform the first projection look-up table into the second projection look-up table 1121' with the projection resolution, storing the second projection look-up table 1121' into the storing unit 112' of the 3-D printing system 11' of the 3-D projection printing system, using the second projection look-up table 1121' as a resulted projection look-up table to calibrate the plurality of sliced printing files 13', and transmitting the plurality of calibrated sliced printing files 13' to a projection system 1111' of a printing control system 111' of a 3D printing system 11' of the 3-D projection printing system 1, and the projection system 1111' engaging in a projection printing work.

As it can be seen, the reflection mirror 25 for the first preferred embodiment and the reflection mirror 25' for the second preferred embodiment can be neglected, hence the whole calibration fixture system may be decreased and lightened in volume and weight, since the calibration fixture system is portable. The camera 22 and 22' for the two preferred embodiments must be with the function of higher resolutions, and can also be replaced by scanner or related image-capturing device.

Figure 6:
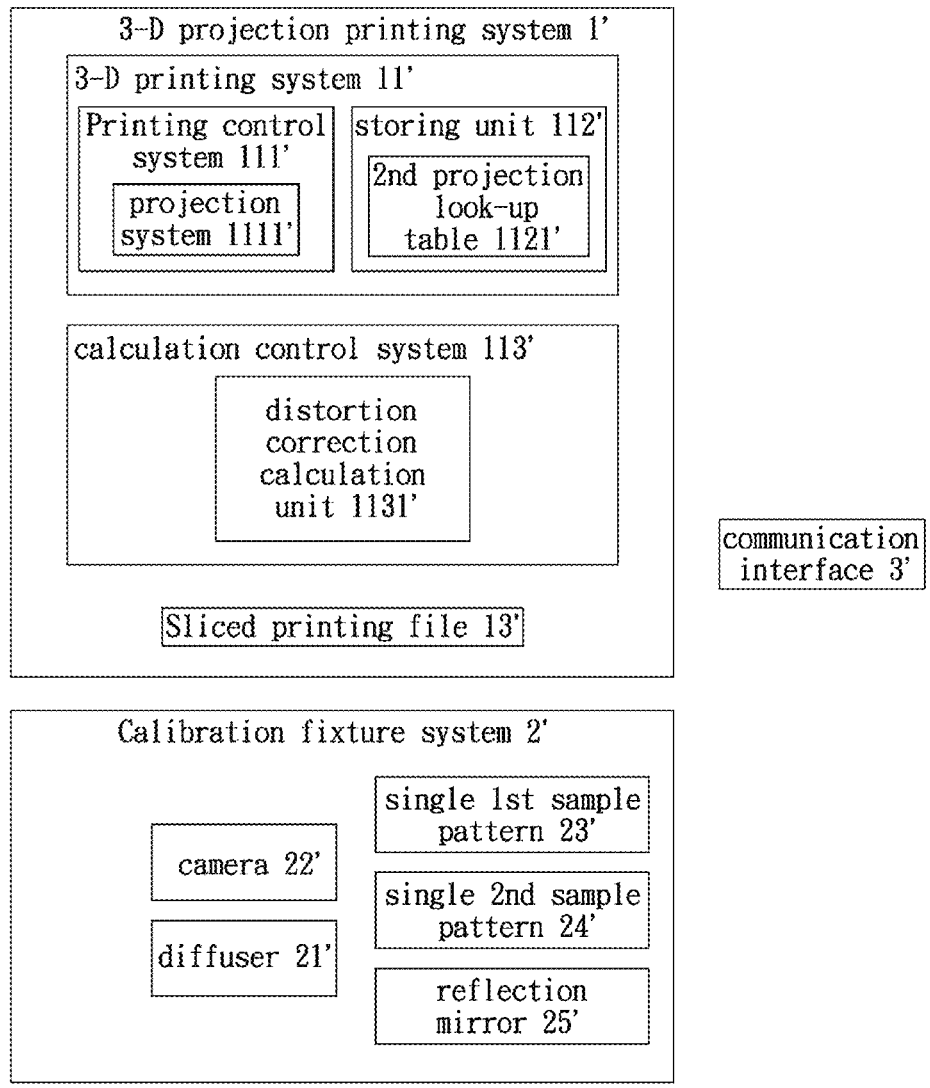
FIG. 6 illustrates a schematic system block of the second preferred embodiment of the present invention.

With reference to FIG. 4 and FIG. 6, two communication interface 3 and 3' for the first and second preferred embodiments play the roles to be communication media for the 3-D projection printing system 1 and the calculation control system 12 of the first preferred embodiment and the 3-D projection printing system 1' and the calculation control system 113' of the second preferred embodiment by way of cable, WIFI, USB, Blue Tooth, etc., or the other wireless/wired methods According to FIG. 4, the calculation control system 12 not designed in the 3-D printing system 11 is to lower cost and raise printing speed, since the calculation control system 12 could be in a cloud system. Correspondingly, FIG. 6 represents that the calculation control system 113' in the 3-D printing system 11' is to increase convenience of printing.

Each of the first sample patterns 23 and 23' and the second sample patterns 24 and 24' is a single and plane pattern, that is to say, the complex procedures of calibration is simplified, and the problem for depth of field may not be occurred, since only one single pattern is vertically faced to the camera. Further, the projected image/pattern is calibrated by means of the look-up table and the interpolation method, therefore time for calculation is saved and image jags phenomena may not happen. Practically, the 3-D printing system 11/11' could be a 3-D printer; the printing control system 111/111' could be a projector, a laser control system, a CPU, an FPGA, etc.; the projection system 1111' could be a projector, etc.; the storing unit 112/112' could be an SD card, an SDRAM, a flash memory, etc.; the calculation control system 12/113' could be a computer, a station, a CPU, a software, a firmware, or a network system, etc.; the distortion correction calculation unit 121/1131' could be hardware as FPGA (Field-Programmable Gate Array) accelerator, GPU (Graphic Processor Unit), etc., or software/firmware as C-code program, etc.; the calibration fixture system 2/2' could be a jig; the light-uniform device 21/21' could be a diffuser. In addition, the calibration fixture system 2/2' as a jig could be portable.

There are two results to prove what the steps (51) to (S6), the steps (51') to (S6'), the steps (S8) to (S14), and the steps (S8') to (S14') of the embodiments have done is better. That is, the RMS (Root Mean Square) results of before and after going through the steps (S1) to (S6) or the steps (S1') to (S6') are 80.3 and 2.2; comparatively, the RMS (Root Mean Square) results of before and after going through the steps (S8) to (S14) or the steps (S8') to (S14') are 31.5 and 2.0.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A fabrication method for a 3-D projection printing system, comprising:
    providing a single first sample pattern having multiple nodes;
    capturing an image of the single first sample pattern to obtain a first practical pattern;
    producing a first camera look-up table according to displacement amounts of nodes between the first practical pattern and the single first sample pattern;
    transforming the first camera look-up table into a second camera look-up table with a camera resolution;
    projecting a single second sample pattern having multiple nodes on a medium by a projector of the 3-D projection printing system;
    capturing an image of the projected single second sample pattern to obtain a second practical pattern;
    using the second camera look-up table to calibrate the second practical pattern to obtain a calibrated pattern;
    producing a first projection look-up table according to displacement amounts of nodes between the calibrated pattern and the single second sample pattern;
    transforming the first projection look-up table into a second projection look-up table with a projector resolution;
    calibrating a plurality of sliced printing files according to the second projection look-up table to form calibrated sliced printing files;
    engaging the calibrated sliced printing files in a projection printing work; and
    fabricating an object with the 3-D projection printing system.

2. The fabrication method for the 3-D projection printing system according to claim 1, wherein each of the single first sample pattern and the single second sample pattern is a grid pattern.

3. The fabrication method for the 3-D projection printing system according to claim 1, wherein a resolution of the second projection look-up table is higher than a resolution of the first projection look-up table.

4. The fabrication method for the 3-D projection printing system according to claim 1, wherein the medium is a diffuser.

5. The fabrication method for the 3-D projection printing system according to claim 1, wherein a resolution of the second camera look-up table is higher than a resolution of the first camera look-up table.

6. The fabrication method for the 3-D projection printing system according to claim 1, further comprising:

transmitting a plurality of calibrated sliced printing files to a printing control system of the 3-D printing system.

7. The fabrication method for the 3-D projection printing system according to claim 6, wherein the plurality of sliced printing files are calibrated by a calculation control system, and the calculation control system is a computer, a station, a CPU, a software, a firmware, or a network system.

8. The fabrication method for the 3-D projection printing system according to claim 1, further comprising:
  reflecting the single first sample pattern and the projected single second sample pattern to be captured by an image-capturing device.

9. The fabrication method for the 3-D projection printing system according to claim 1, further comprising:
  storing the second projection look-up table into a storing unit.

\* \* \* \* \*